United States Patent
Ni et al.

(10) Patent No.: US 8,576,701 B2
(45) Date of Patent: Nov. 5, 2013

(54) METHOD, APPARATUS, AND SYSTEM FOR ACTIVE-STANDBY SWITCHOVER

(75) Inventors: Hui Ni, Beijing (CN); Li Liu, Beijing (CN); Zhibin Zhao, Sao Paulo (BR); Changzhi Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/366,003

(22) Filed: Feb. 3, 2012

(65) Prior Publication Data

US 2012/0134258 A1    May 31, 2012

Related U.S. Application Data

(63) Continuation of application No. PCT/CN2010/077809, filed on Oct. 16, 2010.

(30) Foreign Application Priority Data

Nov. 17, 2009  (CN) .......................... 2009 1 0205951

(51) Int. Cl.
*H04L 12/26* (2006.01)
(52) U.S. Cl.
USPC ............ 370/218; 370/220; 370/221; 370/225
(58) Field of Classification Search
USPC .................. 370/218, 219, 401, 503; 709/227
See application file for complete search history.

(56) References Cited

U.S. PATENT DOCUMENTS

| | | | |
|---|---|---|---|
| 6,327,243 B1 * | 12/2001 | Gregorat ...................... 370/218 |
| 7,940,650 B1 * | 5/2011 | Sandhir et al. ................ 370/219 |
| 2002/0075874 A1 | 6/2002 | Yamashita et al. |
| 2006/0062142 A1 | 3/2006 | Appanna et al. |
| 2006/0179147 A1 * | 8/2006 | Tran et al. ..................... 709/227 |
| 2006/0233182 A1 * | 10/2006 | Appanna et al. .............. 370/401 |
| 2006/0262716 A1 | 11/2006 | Ramaiah et al. |
| 2006/0262734 A1 | 11/2006 | Appanna et al. |
| 2009/0147806 A1 * | 6/2009 | Brueckheimer .............. 370/503 |

FOREIGN PATENT DOCUMENTS

| | | |
|---|---|---|
| CN | 1479452 A | 3/2004 |
| CN | 1536866 A | 10/2004 |
| CN | 1750419 A | 3/2006 |
| CN | 1921454 A | 2/2007 |

(Continued)

OTHER PUBLICATIONS

Written Opinion dated Jan. 27, 2011 in connetion with International Patent Application No. PCT/CN2010/077809, 4 pages.

(Continued)

*Primary Examiner* — Hassan Kizou
*Assistant Examiner* — Toan Nguyen

(57) ABSTRACT

The present invention relates to the field of communication technologies and discloses a method, an apparatus, and a system for active-standby switchover. The method includes: copying at least one packet group to a standby board; recording the copied packet group and generating a transmission rule chain table of an active board according to a sequence of copying, so that the standby board generates a transmission rule chain table of the standby board which is the same as the active transmission rule chain according to the sequence of copying; and transmitting the packet group according to the sequence of the transmission rule chain table of the active board. By using the method, resuming transmission from a breakpoint upon an active-standby switchover is enabled.

4 Claims, 3 Drawing Sheets

(56) References Cited

FOREIGN PATENT DOCUMENTS

| | | | |
|---|---|---|---|
| CN | 101046757 A | 10/2007 |
| CN | 101483540 A | 7/2009 |
| CN | 101719838 A | 6/2010 |
| EP | 1331769 A1 | 7/2003 |
| EP | 2448132 A1 | 5/2012 |
| JP | 2002185510 A | 6/2002 |
| WO | WO 2008/093066 A2 | 8/2008 |

OTHER PUBLICATIONS

Extended European Search Report dated Jun. 13, 2012 in connection with European Patent Application No. 10831092.1, 6 pages.
International Search Report dated Jan. 27, 2011 in connetion with International Patent Application No. PCT/CN2010/077809.
Notice of Reasons for Rejection dated Jul. 31, 2012 in connection with Japanese Patent Application No. 2012-524102.
Communication pursuant to Article 94(3) EPC dated Aug. 1, 2013 in connection with European Patent Application No. 10 831 092.1.

* cited by examiner

METHOD, APPARATUS, AND SYSTEM FOR ACTIVE-STANDBY SWITCHOVER

CROSS-REFERENCE TO RELATED APPLICATIONS

This application is a continuation of International Application No. PCT/CN2010/077809, filed on Oct. 16, 2010, which claims priority to Chinese Patent Application No. 200910205951.1, filed on Nov. 17, 2009, both of which are hereby incorporated by reference in their entireties.

TECHNICAL FIELD

The present invention relates to the field of communication technologies, and in particular to a method, an apparatus, and a system for active-standby switchover.

BACKGROUND

With the continuous development of Internet Protocol (IP) technologies, operators are requiring higher reliable IP networks, and as a highly reliable solution, Non-Stop Route (NSR) technique has emerged. NSR is a technique that is used in a scenario where the control plane of an active board of a router fails and a control plane of a standby board of the router exists, the control plane of a peer is unaware of the failure. The NSR technique is mainly used to enable non-stop routing when routers with standby redundancy are reset upon switchover. That is, the NSR technique enables non-stop forwarding when services are switched on multiple neighboring routers simultaneously.

Group based packetization defined in the Border Gateway Protocol (BGP) is a solution where peers with the same outbound policy are assigned into one packet group, and routes meeting the policy are packetized into packets and the packets are transmitted for multiple times, which greatly increases the efficiency of packet transmission. After BGP group based packetization is implemented, how to combine NSR with group based packetization after an active-standby switchover becomes a new challenge.

In the prior art, after the active board performs switchover, the standby board packetizes local routes into packets and retransmits the packets to all peers. That is, after an active-standby switchover, the standby board directly publishes the packets to the peers again.

During the implementation of the foregoing solution, the inventor discovers that the prior art has at least the following disadvantages: the solution cannot resume transmission from a breakpoint. That is, if an active-standby switchover occurs during the transmission of a packet group, a packet in the transmit buffer is not completely transmitted to some peers. Therefore, for those peers, after an active-standby switchover, the standby board does not resume transmission from their respective breakpoints. Instead, the standby board packetizes all the routes into packets and transmits the packets again. Thus, erroneous packet is produced and large quantities of system and network resources are consumed after the switchover. In addition, the standby board responds slowly to a change of topology.

SUMMARY

Embodiments of the present invention provide a method, an apparatus, and a system for active-standby switchover so as to reduce the consumption of network resources and enable resuming transmission from a breakpoint after an active-standby switchover.

To achieve the foregoing purposes, the embodiments of the present invention apply the following technical solution:

An active-standby switchover method includes:
before transmitting a corresponding packet group to a peer under a peer session, copying at least one corresponding packet group to a standby board;
recording the copied packet group and generating a transmission rule chain table of an active board according to the sequence of copying, so that the standby board generates a transmission rule chain table of the standby board which is the same as the transmission rule chain table of the active board according to the sequence of copying; and
transmitting the packet group according to the sequence of the transmission rule chain table of the active board, so that the standby board monitors the transmission progress of the active board according to the transmission rule chain table of the standby board and resumes transmission from a breakpoint upon an active-standby switchover.

An active-standby switchover method includes:
receiving, before an active board transmits a corresponding packet group to a peer under a peer session, at least one packet group copied by the active board;
recording the copied packet group and generating a transmission rule chain table of a standby board which is the same as a transmission rule chain table of the active board according to the sequence of copying;
monitoring, according to the transmission rule chain table of the standby board, the transmission progress of the active board in transmitting packet group under the peer session according to the transmission rule chain table of the active board; and
after an active-standby switchover, transmitting the corresponding copied packet group according to the monitored progress, so as to resume transmission from a breakpoint.

An active-standby switchover apparatus includes:
a copying unit, configured to, before transmitting a corresponding packet group to a peer under a peer session, copy at least one corresponding packet group to a standby board;
an active generating unit, configured to record the copied packet group and generate, according to the sequence of copying, a transmission rule chain table of an active board; and
a transmitting unit, configured to transmit the packet group according to the sequence of the transmission rule chain table.

An active-standby switchover apparatus includes:
a receiving unit, configured to receive at least one packet group copied by an active board before the active board transmits a corresponding packet group to a peer under a peer session;
a standby generating unit, configured to record the copied packet group and generate, according to the sequence of copying, a transmission rule chain table of an standby board, which is the same as a transmission rule chain table of the active board;
a monitoring unit, configured to monitor, according to the sequence of the transmission rule chain table of the standby board, the transmission progress of the active board in transmitting the packet group under the peer session according to the transmission rule chain table of the active board; and
a transmission resuming unit, configured to, after an active-standby switchover, transmit the corresponding copied packet group according to the monitored progress so as to resume transmission from a breakpoint.

An active-standby switchover system includes:

an active board, configured to copy at least one corresponding packet group to a standby board before transmitting a corresponding packet group to a peer under a peer session, record the copied packet group and generate a transmission rule chain table of the active board according to the sequence of copying, and transmit the packet group according to the sequence of the transmission rule chain table of the active board; and the standby board, configured to receive the at least one packet group which is copied by the active board before the active board transmits a corresponding packet group to a peer under the peer session, record the copied packet group, generate according to the sequence of copying a transmission rule chain table of the standby board which is the same as the transmission rule chain table of the active board, monitor, according to the sequence of transmission rule chain table of the standby board, the transmission progress of the active board in transmitting the packet group under the peer session according to the transmission rule chain table of the active board, and, after an active-standby switchover, transmit the corresponding copied packet group according to the monitored progress so as to resume transmission from a breakpoint.

The technical solution provided in the embodiments of the present invention has the following advantages: before an active board transmits a packet of a packet group to a peer, the active board and the standby board negotiate rule for transmitting the packet to the peer, and the active board copies the packet to be transmitted to the peer to the standby board. When the active board transmits the packet to the peer, the active board transmits the packet to the peer according to the sequence of the negotiated chain table. The standby board traces the packet transmitted by the active board according to the same sequence of the chain table. Therefore, the standby board need not deeply parse the packet transmitted by the active board to know the progress of the active board in transmitting the packet to the peer. Thus, the burden of the standby board is reduced. After an active-standby switchover, the standby board continues to transmit the packet copied by the active board according to the monitored progress, so that the transmission behavior of the standby board is consistent with that of the active board, and the standby board can perform breakpoint resume transmission from the monitored position after an active-standby switchover without need to transmit all the packets again, thus the waste of network resources is reduced. The standby board is able to take over services of the active board quickly without outside awareness.

DETAILED DESCRIPTION

To better explain the technical solution in the embodiments of the present invention, the embodiments of the present invention will be described in detail with reference to the accompanying drawings. It is apparent that the embodiments herein are only part of rather than all of the embodiments of the present invention. Based on the embodiments of the present invention herein, those of ordinary skill in the art can derive other embodiments without creative efforts and all such embodiments shall fall within the protection scope of the present invention. Besides, the embodiments herein are all optional solutions of the present invention. The arranging sequence and the numbering of the embodiments are not related to their priorities.

Embodiment 1

Figure 1:
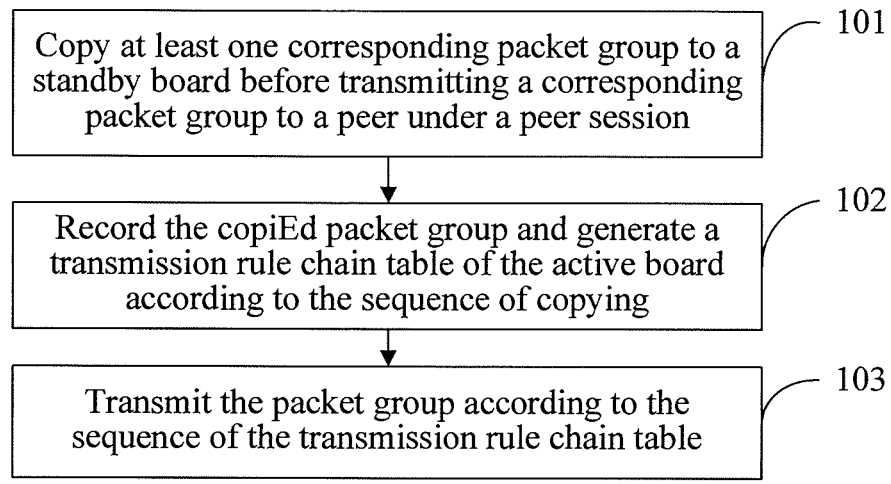
FIG. 1 is a schematic flowchart of an active-standby switchover method according to a first embodiment of the present invention.

A first embodiment of the present invention provides an active-standby switchover method. The method is applicable to an active board deployed on a router. As shown in FIG. 1, the method includes the following steps:

Step 101: before transmitting a corresponding packet group to a peer under a peer session, copy at least one corresponding packet group to a standby board.

Step 102: Record the copied packet group and generate a transmission rule chain table of an active board according to the sequence of copying, so that the standby board generates a transmission rule chain table of the standby board which is the same as the transmission rule chain of the active board according to the sequence of copying.

In the process of copying the packet group, the active board copies the packet group one after another, and therefore, the aforementioned sequence of copying is the sequence of copying the packet group.

Step 103: transmit the packet group according to the transmission rule chain table of the active board, so that the standby board monitors the transmission progress of the active board according to the standby transmission rule chain and resumes transmission from a breakpoint upon an active-standby switchover.

In the aforementioned active-standby switchover method, the active board performs transmission and the standby board traces the transmission according to the same chain table. Therefore, even if an active-standby switchover occurs at a certain point of the chain table and a packet in the transmission buffer of a packet group is not completely transmitted to some peers, the standby board still knows which point of the chain table the active board stops according to the same chain table. After the switchover, for those peers, the standby board can resume transmission from a breakpoint at which the switchover occurs.

The solution provided in the embodiment of the present invention has the following advantages: an active board copies a packet group to a standby board before transmitting the a packet in the packet group to each peer under a peer session, and thereby, after an active-standby switchover, the standby board can obtain the packet in a packet group which has been transmitted. Meanwhile, the active board transmits a packet in the packet group to a peer under the peer session according to the transmission rule chain table negotiated with the standby board, so that the standby board can take over services of the active board quickly after the active-standby switchover and trace the transmission progress of the active board according to the same transmission rule chain table to resume transmission from a breakpoint. The standby board need not retransmit all packets again and therefore, the waste of network resources is reduced.

Embodiment 2

Figure 2:
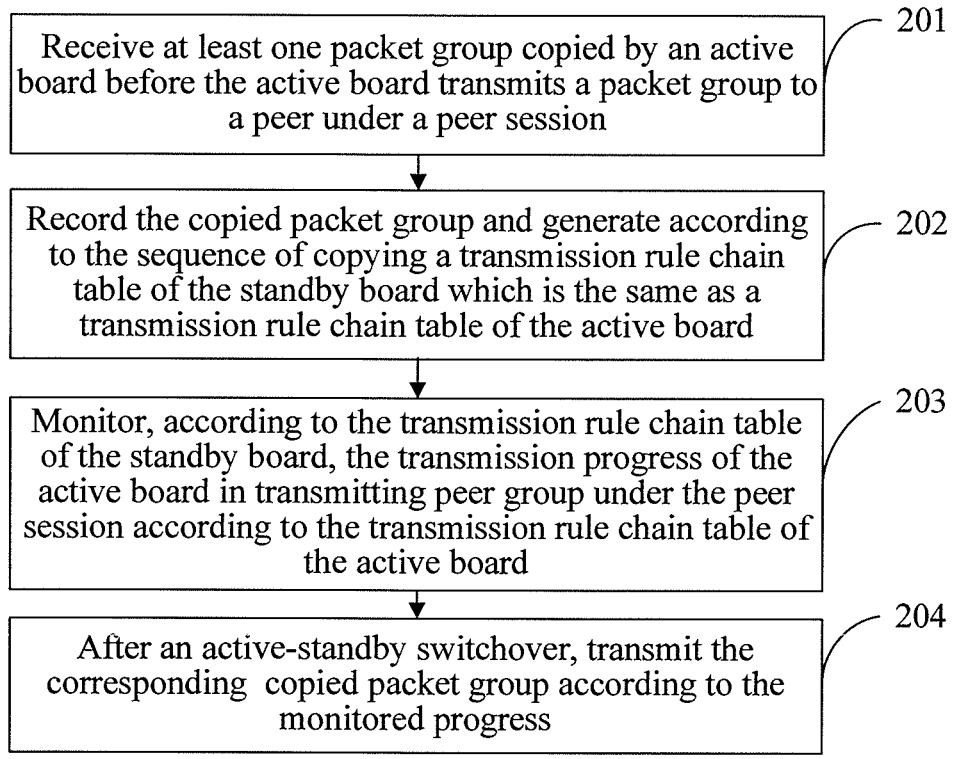
FIG. 2 is a schematic flowchart of an active-standby switchover method according to a second embodiment of the present invention.

A second embodiment of the present invention provides an active-standby switchover method. The method is applicable to a standby board deployed on a router. As shown in FIG. 2, the method includes:

Step 201: receive at least one packet group copied by an active board before the active board transmits a corresponding packet group to a peer under a peer session.

Step 202: record the copied packet group and generate a transmission rule chain table of a standby board which is the same as the transmission rule chain table of the active board according to the sequence of copying.

Step 203: monitor, according to the transmission rule chain table of the standby board, the transmission progress of the active board in transmitting the packet group under the peer session according to the transmission rule chain table of the active board.

Step 204: after an active-standby switchover, transmit the corresponding copied packet group according to the monitored progress so as to resume transmission from a breakpoint.

The solution provided in the embodiment of the present invention provides the following advantages: the standby board traces the transmission progress of the active board according to the transmission rule chain table negotiated with the active board regarding the transmission of the packets in the packet group to a peer under a peer session. Thereby, the standby board knows the transmission progress of the active board in transmitting the packet group to the peer under the peer session without need to deeply parse the packet group transmitted by the active board. Thus, the solution reduces the burden of the standby board. After an active-standby switchover, the standby board can continue transmitting the packet in the packet group copied by the active board according to the monitored position of a packet group. Thus, the transmission of the standby board is consistent with that of the active board and the standby board can resume transmission from a breakpoint without need to retransmit packets in all the packet groups again. Thereby, the solution reduces the waste of network resources.

Embodiment 3

Figure 3:
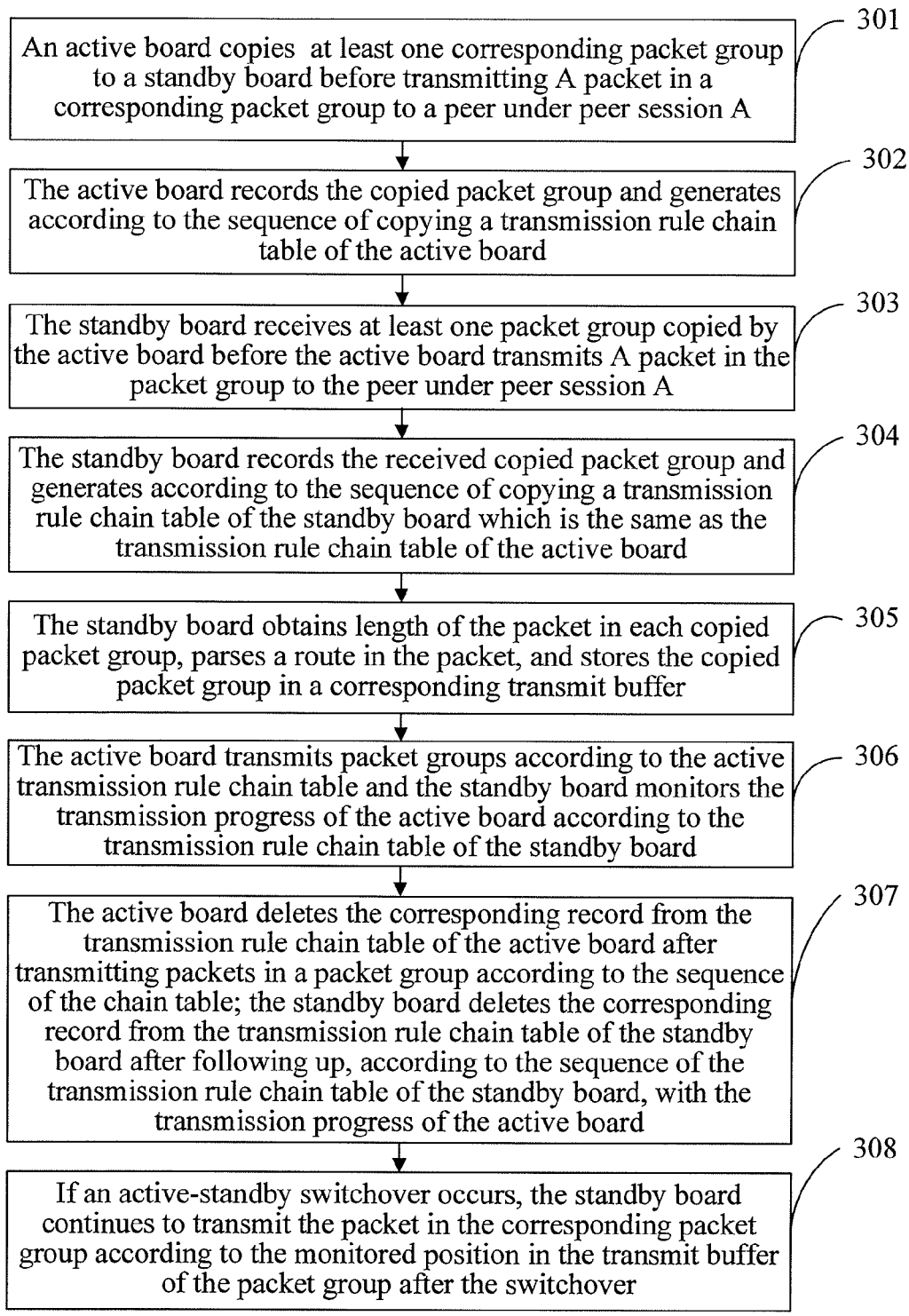
FIG. 3 is a schematic flowchart of an active-standby switchover method according to a third embodiment of the present invention.

A third embodiment of the present invention provides an active-standby switchover method specifically. The method relates to an active board and a standby board, where the active board transmits a packet in a corresponding packet group to a peer under a peer session A. Specifically, in this embodiment, the packet is a BGP update message packet. As shown in FIG. 3, the method includes:

Step 301: before transmitting a packet in a corresponding packet group to a peer under a peer session A, an active board copies at least one corresponding packet group to a standby board. Each packet group copied by the active board includes at least a packet and the following information: ID of each packet group and ID of the transmit buffer in which the active board stores the packet group. The information is used by the standby board to generate a transmission rule chain table of the standby board which is the same as the transmission rule chain table of the active board after receiving the copied packet group.

Step 302: the active board records the copied packet group and generates a transmission rule chain table of the active board according to the sequence of copying, so that the standby board generates a transmission rule chain table of the standby board which is the same as the transmission rule chain table of the active board according to the sequence of copying. The active board may put the generated transmission rule chain table of the active board under the peer session A.

Specifically, in step 302, the active board records the packet group ID of the copied packet group and ID of the transmit buffer in which the packet group is stored; and generates a transmission rule chain table of the active board that includes ID of each copied packet group and ID of the transmit buffer in which the packet group is stored on the active board according to the sequence of copying. It should be noted that the generated transmission rule chain table of the active board is the same as the transmission rule chain table of the standby board which is generated by the standby board upon reception of the at least one copied packet group.

In the embodiment of the present invention, the transmission rule chain table of the active board under peer session A may be in the form of Table 1.

TABLE 1

Peer session A

| Peer number | | ID of packet group 2 | |
|---|---|---|---|
| Transmit buffer | → | ID of transmit buffer 2 | ...... |
| | | ID of packet group 3 | |
| | | ID of transmit buffer 1 | |

Step 303: the standby board receives the at least one packet group copied by the active board before the active board transmits a packet in the corresponding packet group to the peer under the peer session A.

Step 304: the standby board records the received copied packet group and generates the transmission rule chain table of the standby board which is the same as the transmission rule chain table of the active board according to the sequence of copying. Each copied packet group in the received at least one copied packet group includes at least the following information: ID of the packet group and ID of the transmit buffer in which the active board stores the packet group.

Specifically, step 304 may be implemented as follows: for each received copied packet group, the standby board records the packet group ID of the copied packet group and the transmit buffer ID of the transmit buffer in which the active board stores the packet group and generates a transmission rule chain table of the standby board that includes the packet group ID and the transmit buffer ID of each copied packet group according to the sequence of copying. The transmission rule chain table of the standby board generated by the standby board is the same as the transmission rule chain table of the active board generated by the active board, as described in Table 1.

Refer to Table 1, step 304 includes: the standby board receives packet group 2 copied by the active board and obtains the packet group ID of packet group 2 and the ID of transmit buffer 2 in which the active board stores packet group 2. The standby board records the ID of packet group 2 and the ID of transmit buffer 2 in a corresponding relationship in the transmission rule chain table of the standby board (Table 1). Then, the standby board receives packet group 3 copied by the active board and obtains the ID of packet group 3 and the ID of transmit buffer 1 in which the active board stores packet group 3, and records the ID of packet group 3 and the ID of transmit buffer 1 in a corresponding relationship in the transmission rule chain table of the standby board (Table 1). In this manner, the standby board records the received copied packet groups according to the sequence of copying.

Step 305: the standby board obtains the length of the packet in each received copied packet group; parses the routes in the packet and records the routing information of each parsed route, where the routing information includes at least the path attribute and the transmission record of each route; and stores each copied packet group in the transmit buffer indicated by the corresponding transmit buffer ID according to the relationship between each copied packet group and its transmit buffer in the transmission rule chain table of the standby board.

Specifically, in step 305, a socket of the standby board obtains the length of the packet in each received copied packet group, and parses the routes in the packet and records the routing information of each route. The routing information includes at least the path attribute of each route and the transmission record of which peer the route has been sent. The standby board stores the copied packet group into the transmit buffer indicated by the corresponding transmit buffer ID according to the corresponding relationship in Table 1.

Alternatively, in step 305, a socket of the standby board obtains the length of the packet in each received copied packet group; stores the packet group into the transmit buffer indicated by the corresponding transmit buffer ID according to the corresponding relationship in Table 1; and parses the routes in the packet of the packet group and records the routing information of each parsed route, where the routing information includes at least the path attribute of each route and the transmission record to which peer session the route has been sent.

Step 306: The active board transmits packet group in a sequence according to the transmission rule chain table of the active board, so that the standby board monitors the transmission progress of the active board according to the transmission rule chain table of the standby board and resumes transmission from a breakpoint after an active-standby switchover. Meanwhile, the standby board monitors, according to the transmission rule chain table of the standby board, the transmission progress of the active board in transmitting the packet group under the peer session A according to the transmission rule chain table of the active board.

FIG. 7 is a schematic diagram of an implementation scenario of the active and standby boards according to the embodiment of the present invention.

Specifically, in step 306, the active board obtains a packet group from the transmit buffer indicated by the corresponding transmit buffer ID according to a sequence of the transmission rule chain table of the active board under peer session A and transmits the packet in the packet group to corresponding peers. Meanwhile, the standby board traces the packet group ID of the last transmitted packet group transmitted by the active board under the peer session A according to the sequence of the transmission rule chain table of the standby board and slides for the obtained length in the transmit buffer indicated by the transmit buffer ID corresponding to the traced packet group ID so as to catch up with the progress of the active board in transmitting the packet group.

It should be noted that, before the active board of a router transmits a packet group to a corresponding peer, a relationship between the packet group and the corresponding peer is preset in the data structure, and therefore, if the active board knows the packet group ID, the active board knows to which peer the packet group will be transmitted according to the preset relationship. This is also true for the standby board of the router, that is, if the standby board knows the packet group ID, the standby board knows to which peer the packet group will be transmitted according to the preset relationship.

Referring to Table 1, if the active board obtains packet group 2 according to the sequence in the chain table, the active board knows the ID of transmit buffer 1 corresponding to packet group 2 according to the ID of packet group 2. The active board locates the corresponding transmit buffer according to the ID of transmit buffer 1 and transmits the packet stored in the located transmit buffer as the packet in packet group 2 to the peer corresponding to packet group 2. Meanwhile, the standby board traces the ID of packet group 2 according to the sequence in Table 1 and knows, according to the corresponding relationship recorded in Table 1, that the packet of packet group 2 is stored in transmit buffer 2 indicated by the ID of transmit buffer 2 and slides the length of the packet of packet group 2 in transmit buffer 2 to further monitor the progress of the active board in transmitting the packet in packet group 2.

Step 307: The active board deletes the record corresponding to the packet group from the transmission rule chain table of the active board after the active board has completely transmitted the packets in the packet group to a corresponding peer according to the sequence of the transmission rule chain table of the active board. The standby board deletes the record corresponding to the packet group from the transmission rule chain table of the standby board which is generated by the active board after catching up with the transmission progress of the active board according to the sequence of the transmission rule chain table of the standby board.

Referring to Table 1, the active board deletes the ID of packet group 2 and the ID of transmit buffer 2 corresponding to packet group 2 from the chain table after the active board completes transmitting the packets in packet group 2 to a corresponding peer according to the sequence of the chain table. The standby board also deletes the ID of packet group 2 and the ID of transmit buffer 2 corresponding to packet group 2 from the chain table after catching up with the packet in packet group 2 transmitted by the active board according to the sequence of the chain table.

In addition, after the packets in a packet group corresponding to a transmit buffer have been transmitted completely, the active board and/or the standby board can release the transmit buffer. For example, after packets in all packet groups corresponding to transmit buffer 2 have been transmitted completely according to the sequence of the chain table, the transmit buffer 2 can be released.

It should be noted that in the embodiment of the present invention, the process of transmitting the corresponding packet group to a peer under the peer session A is taken as an example for description. The process of transmitting a corresponding packet group to a peer under other peer session is alike and is not repeatedly described herein.

Step 308: If an active-standby switchover occurs before the active board completes transmitting a packet in a packet group to a peer under the peer session A, after the switchover, the standby board continues to transmit the packet in the packet group to the peer according to the traced position in the transmit buffer corresponding to the packet group, so as to resume transmission from a breakpoint.

In addition, after the standby board completes transmission of a packet in the packet group from a breakpoint, the standby board may find route whose path attribute has changed and route whose transmission record indicates it is not transmitted according to the routing information recorded in step 305, and advertises the found route whose path attribute has changed and route which has not been transmitted to the peer again.

The technical solution provided in the embodiment of the present invention has the following advantages: Before a peer under a peer session transmits a packet in a packet group corresponding to the peer, the active board and the standby board reach an agreement on rules for transmitting the packet group to the peer session. Moreover, the active board copies the packet to be transmitted to the peer session to the standby board. When the active board transmits packet group to the peer session, the active board transmits the packet group to the peer session in a sequence according to the agreed chain table, and the standby board traces the packet group that the active board has sent in the same sequence. Therefore, the standby board need not parse the packet transmitted by the active board in depth to know the packet group that the active board is currently transmitting to the peer session and the position of the packet group that is currently transmitting. Thus, the burden of the standby board is reduced. After an active-standby switchover, the standby board can continue to transmit the packet in the packet group copied by the active board according to the traced position, so that the transmission behavior of the standby board is consistent with that of the active board and the standby board can resume transmission from a breakpoint after an active-standby switchover. Erroneous packet will not be produced and the standby board need not transmit all packets again, thus the waste of network resources is reduced. The standby board is able to take over services of the active board quickly without outside awareness.

Embodiment 4

Figure 4:
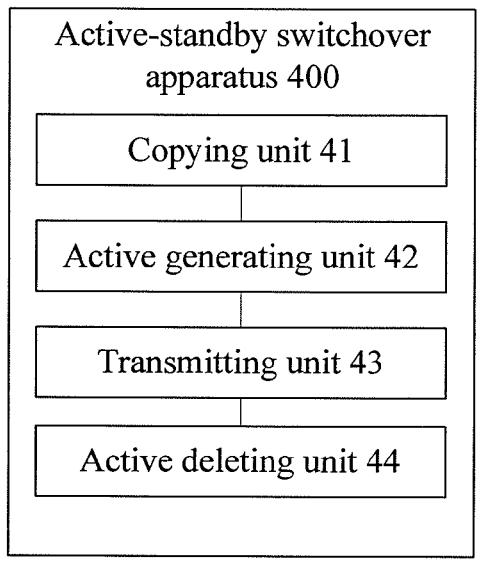
FIG. 4 is a schematic structural diagram of an active-standby switchover apparatus according to a fourth embodiment of the present invention.

A fourth embodiment of the present invention provides an apparatus 400 for active-standby switchover. Specifically, the apparatus 400 may be an active board of a router. As shown in FIG. 4, the apparatus 400 includes a copying unit 41, an active generating unit 42, and a transmitting unit 43.

The copying unit 41 is configured to copy at least one corresponding packet group to a standby board before transmitting a corresponding packet group to a peer under a peer session. The active generating unit 42 is configured to record the copied packet group and generate a transmission rule chain table of the active board according to the sequence of copying. The transmitting unit 43 is configured to transmit packet group according to the sequence of the transmission rule chain table.

The apparatus 400 in the embodiment of the present invention further includes an active deleting unit 44, configured to delete a record corresponding to a packet group from the transmission rule chain table of the active board after the transmitting unit completes transmitting packets in the corresponding packet group according to the transmission rule chain table of the active board.

The apparatus provided in the embodiment of the present invention has the following advantages: before transmitting a packet in a packet group to a peer under a peer session, the packet group to be transmitted to the peer session is copied to a standby board, so that the standby board can obtain the packet group for resuming transmission after an active-standby switchover. Meanwhile, the apparatus provided in the embodiment of the present invention can transmit packet group according to the sequence of the chain table negotiated with the standby board, so that the standby board can take over services of the active board quickly after an active-standby switchover and traces the transmission progress of the active board according to the chain table with the same rule to resume transmission from a breakpoint. Thus, the standby board need not transmit all packets again and the waste of network resources is reduced.

Embodiment 5

Figure 5:
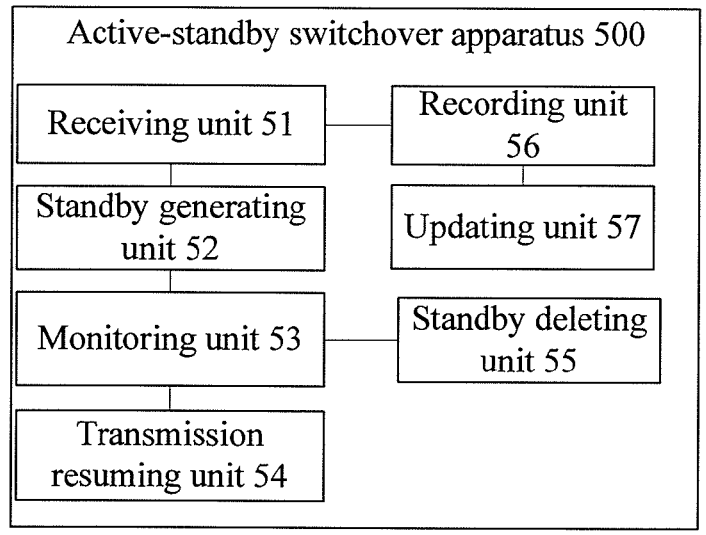
FIG. 5 is a schematic structural diagram of an active-standby switchover apparatus according to a fifth embodiment of the present invention.

A fifth embodiment of the present invention provides an apparatus 500 for active-standby switchover. Specifically, the apparatus 500 may be a standby board of a router. As shown in FIG. 5, the apparatus 500 includes a receiving unit 51, a standby generating unit 52, a monitoring unit 53, and a transmission resuming unit 54.

The receiving unit 51 is configured to receive at least one packet group copied by an active board before the active board transmits corresponding packet group to a peer under a peer session. The standby generating unit 52 is configured to record the copied packet group received by the receiving unit 51 and generate a transmission rule chain table of the standby board which is the same as the transmission rule chain table of the active board according to the sequence of copying. The monitoring unit 53 is configured to monitor, according to the transmission rule chain table of the standby board generated by the standby generating unit 52, the transmission progress of the active board in transmitting packet group under the peer session according to the transmission rule chain table of the active board. The transmission resuming unit 54 is configured to transmit the corresponding copied packet group according to the progress monitored by the monitoring unit 53 to resume transmission from a breakpoint.

In the embodiment of the present invention, the apparatus 500 may further include the following optional units: a standby deleting unit 55, a recording unit 56, and an updating unit 57.

The standby deleting unit 55 is configured to delete a record corresponding to a packet group from the transmission rule chain table of the standby board after the monitoring unit traced the packet group transmitted by the active board according to the sequence of the transmission rule chain table of the standby board.

The recording unit 56 is configured to parse route in the packet of the copied packet group and record at least the path attribute and transmission record of each parsed route. The updating unit 57 is configured to determine, according to the path attribute and transmission record of each route recorded by the recording unit 56, route needed to be re-advertised.

The apparatus for active-standby switchover provided in the embodiment of the present invention can trace the transmission progress of the mater board in transmitting packet group according to the transmission rule chain table negotiated with the active board regarding the transmission of packet group to a peer session. Therefore, the apparatus need not parse the packet transmitted by the active board in depth to know the transmission progress of the active board in transmitting the packet group to the peer session. The burden of the apparatus is thus reduced. Moreover, after an active-standby switchover, the apparatus can continue to transmit the packet group copied by the active board according to the traced position, thus maintain consistent with the transmission behavior of the active board. As the apparatus can resume transmission from a breakpoint after a switchover, the apparatus need not retransmit all packets and therefore the waste of network resources is reduced.

Embodiment 6

Figure 6:
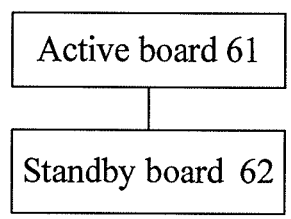
FIG. 6 is a schematic diagram of an active-standby switchover system according to a sixth embodiment of the present invention.

A sixth embodiment of the present invention provides a system for active-standby switchover. As shown in FIG. 6, the system includes:

an active board 61, configured to copy at least one packet group to a standby board 62 before transmitting a corresponding packet group to a peer under a peer session, record the copied packet group and generate a transmission rule chain table of the active board according to the sequence of copying, and transmit the packet group according to the sequence of the transmission rule chain table of the active board; and the standby board 62, configured to receive the at least one packet group copied by the active board 61 before the active board 61 transmits a corresponding packet group to a peer under the peer session, record the copied packet group, generate a transmission rule chain table of the standby board which is the same as the transmission rule chain table of the active board according to the sequence of copying, monitor, according to the transmission rule chain table of the standby board, the transmission progress of the active board in transmitting the packet group under the peer session according to the transmission rule chain table of the active board, and, after an active-standby switchover, transmit the corresponding copied packet group according to the monitored progress so as to resume transmission from a breakpoint.

In addition, in the embodiment of the present invention, the active board 61 is further configured to delete a record corresponding to a packet group from the transmission rule chain table of the active board after completing transmitting packets in the packet group according to the sequence of the transmission rule chain table of the active board.

Accordingly, the standby board 62 is further configured to delete a record corresponding to the packet group from the transmission rule chain table of the standby board after traced the packet group transmitted by the active board according to the sequence of the transmission rule chain table of the standby board. In addition, the standby board 62 is further configured to parse route in the packet of the copied packet group, record at least the path attribute and transmission record of each parsed route, and determine route needed to be re-advertised according to the recorded path attribute and transmission record of each route.

The system provided in the embodiment of the present invention has the following advantages: before transmitting a corresponding packet group to a peer under a peer session, the active board and the standby board reach an agreement on rules for transmitting packet group to the peer session, and the active board copies packet group to be transmitted to the peer session to the standby board. When the active board transmits the packet group to the peer session, the active board transmits the packet group to the peer session according to the sequence of the negotiated chain table, and the standby board traces the progress of the active board according to the chain table with the same sequence. Therefore, the standby board need not parse the packet transmitted by the active board in depth to know the transmission progress of the active board. Thus, the burden of the standby board is reduced. After an active-standby switchover, the standby board continues to transmit the packet in the packet group copied by the active board according to the monitored position, so that the transmission behavior of the standby board is consistent with that of the active board and the standby board can resume transmission from a breakpoint after an active-standby switchover without need to transmit all packet again, thus the waste of network resources is reduced. The standby board is able to take over services of the active board quickly without outside awareness.

The technical solution provided in the embodiments of the present invention can be applied to the high reliability feature design of other protocols. If a protocol requires that the control flow of the standby board continue the processing of the active board after an active-standby switchover, the method for synchronized data transmission to the standby board in this application can be adopted. If certain data with group based packetization requires active-standby synchronization, the method for transmitting packets without deep parsing of the standby board herein can be referred to.

Through the foregoing description of the embodiments of the present invention, those skilled in the art are clearly aware that the present invention may be implemented through hardware, or, preferably in most circumstances, through software in addition to a necessary universal hardware platform. Based on such understanding, the essence of the technical solution of the embodiments of the present invention or its contributions to the prior art can be embodied in a software product. The software product is stored in a readable storage medium, such as a floppy disc, a hard disc, or a compact disc of a computer, and incorporates several instructions for instructing a device (for example, a router or gateway) to execute all or part of the steps in the embodiments of the present invention.

Although the present invention has been described in detail through some exemplary embodiments, the present invention is not limited to such embodiments. It is apparent that those skilled in the art can make various modifications and variations to the present invention without departing from the spirit and scope of the present invention. The present invention is intended to cover the modifications and variations provided that they fall within the protection scope defined by the claims or their equivalents.

What is claimed is:

1. An active-standby switchover method, comprising:
receiving at least one packet group copied by an active board before the active board transmits a corresponding packet group to a peer under a peer session;
recording the copied packet group and generating a transmission rule chain table of a standby board which is the same as a transmission rule chain table of the active board according to a sequence of copying, wherein the transmission chain table of the standby board records the ID of each copied packet group and ID of the transmit buffer in which the active board stores the packet group according to the sequence of copying;
for each received copied packet group, obtaining length of a packet in the packet group and storing the packet group in a transmit buffer indicated by the corresponding transmit buffer ID in the chain table;
monitoring, according to the transmission rule chain table of the standby board, the transmission progress of the active board in transmitting the packet group under the peer session according to the transmission rule chain table of the active board; and
after an active-standby switchover, transmitting the copied packet group according to the monitored progress so as to resume transmission from a breakpoint;
wherein the monitoring, according to the transmission rule chain table of the standby board, the transmission progress of the active board in transmitting the packet group under the peer session according to the transmission rule chain table of the active board comprises:

tracing, according to the transmission rule chain table of the standby board, the packet group ID which active board is transmitting under the peer session according to the transmission rule chain table of the active board, and sliding the obtained length in a transmit buffer indicated by the transmit buffer ID corresponding to the traced packet group ID to trace the progress of the active board in transmitting the packet group.

2. The method according to claim 1, wherein each received copied packet group comprises: ID of the packet group and ID of a transmit buffer in which the active board stores the packet group; and the recording the copied packet group and generating a transmission rule chain table of a standby board which is the same as a transmission rule chain table of the active board according to the sequence of copying comprises:

recording ID of the copied packet group and ID of transmit buffer in where the active board stores the packet group; and generating according to the sequence of copying the transmission rule chain table of the standby board which is the same as the transmission rule chain table of the active board and comprises the ID ,of the copied packet group and the ID of the transmit buffer in which the active board stores the packet group.

3. The method according to claim 1, further comprising:

deleting a record corresponding to the packet group from the transmission rule chain table of the standby board after traced, according to the sequence of the transmission rule chain table of the standby board, the packet group transmitted by the active board.

4. The method according to claim 1, further comprising:

parsing a route in the packet in a copied packet group and recording at least the path attribute and transmission record of each parsed route; and determining a route needed to be re-advertised according to the recorded path attribute and transmission record of each route after an active-standby switchover.

* * * * *